United States Patent
Irwan et al.

(10) Patent No.: US 11,652,610 B2
(45) Date of Patent: May 16, 2023

(54) MULTI-LAYER LEDGERS FOR MULTI-PARTY SECURE DATA GOVERNANCE

(71) Applicant: Xage Security, Inc., Palo Alto, CA (US)

(72) Inventors: Susanto Junaidi Irwan, San Francisco, CA (US); Bao Q. Ngo, San Jose, CA (US); Alexander Michael Valderrama, Palo Alto, CA (US); Tianyu Zhao, Sunnyvale, CA (US); Tu Pham, San Jose, CA (US)

(73) Assignee: Xage Security, Inc., Palo Alto, CA (US)

( * ) Notice: Subject to any disclaimer, the term of this patent is extended or adjusted under 35 U.S.C. 154(b) by 242 days.

(21) Appl. No.: 17/009,406

(22) Filed: Sep. 1, 2020

(65) Prior Publication Data

US 2021/0143981 A1    May 13, 2021

Related U.S. Application Data

(63) Continuation of application No. 16/680,788, filed on Nov. 12, 2019, now Pat. No. 10,805,069.

(51) Int. Cl.
| | |
|---|---|
| *H04L 9/06* | (2006.01) |
| *H04L 9/08* | (2006.01) |
| *H04L 9/40* | (2022.01) |
| *H04L 9/00* | (2022.01) |

(52) U.S. Cl.
CPC ............ *H04L 9/0643* (2013.01); *H04L 9/083* (2013.01); *H04L 63/045* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 10,579,974 B1 * | 3/2020 | Reed | ................... G06Q 20/065 |
| 2012/0303949 A1 | 11/2012 | Liu et al. | |
| 2017/0289134 A1 | 10/2017 | Bradley et al. | |
| 2017/0352012 A1 * | 12/2017 | Hearn | ................ G06Q 20/3829 |
| 2018/0005186 A1 | 1/2018 | Hunn | |
| 2018/0278637 A1 | 9/2018 | Kuperman et al. | |
| 2019/0243572 A1 | 8/2019 | Kursun | |
| 2019/0325044 A1 | 10/2019 | Gray | |

OTHER PUBLICATIONS

The International Searching Authority, "Search Report" in application No. PCT/US2020/058495, dated Dec. 21, 2020, 7 pages.

(Continued)

*Primary Examiner* — Brandon Hoffman
(74) *Attorney, Agent, or Firm* — Hickman Becker Bingham Ledesma LLP

(57) ABSTRACT

A computer-implemented method of providing data governance as data flows within and between networks, comprising: using a global computing device, retrieving data stored in a plurality of local ledgers and written by a plurality of local computing devices, wherein validity of the data stored in the plurality of local ledgers has not been verified prior to writing; using the global computing device, determining that the plurality of local ledgers is cryptographically consistent and, in response to the determination, updating a global ledger with the data stored in the plurality of local ledgers.

20 Claims, 5 Drawing Sheets

(56) References Cited

OTHER PUBLICATIONS

Current Claims in application No. PCT/US2020/058495, dated Dec. 2020, 3 pages.
The International Searching Authority, "Search Report" in application No. PCT/US2020/018053, dated Apr. 14, 2020, 9 pages.
Current Claims in application No. PCT/US2020/018053, dated Apr. 2020.

* cited by examiner

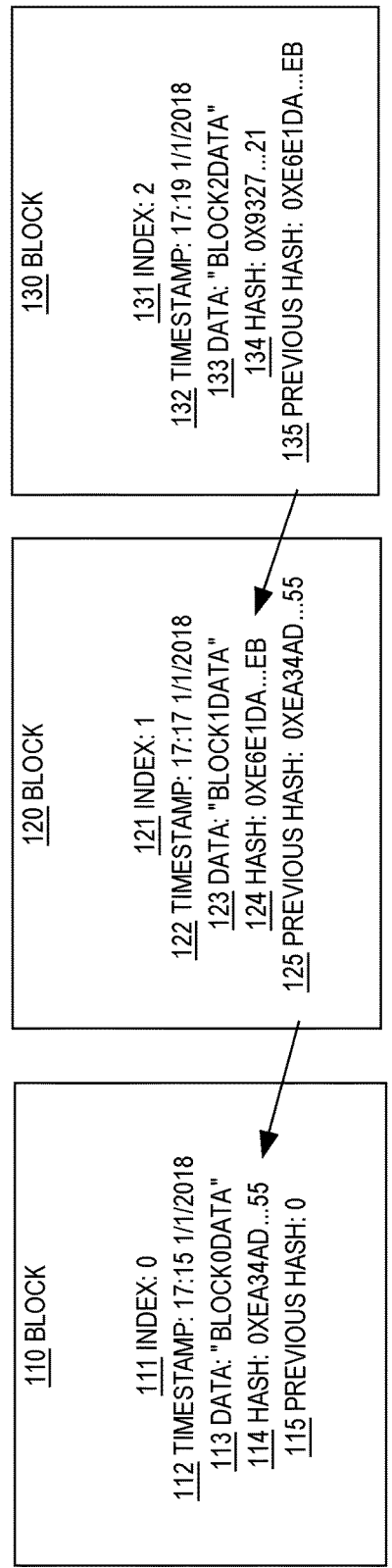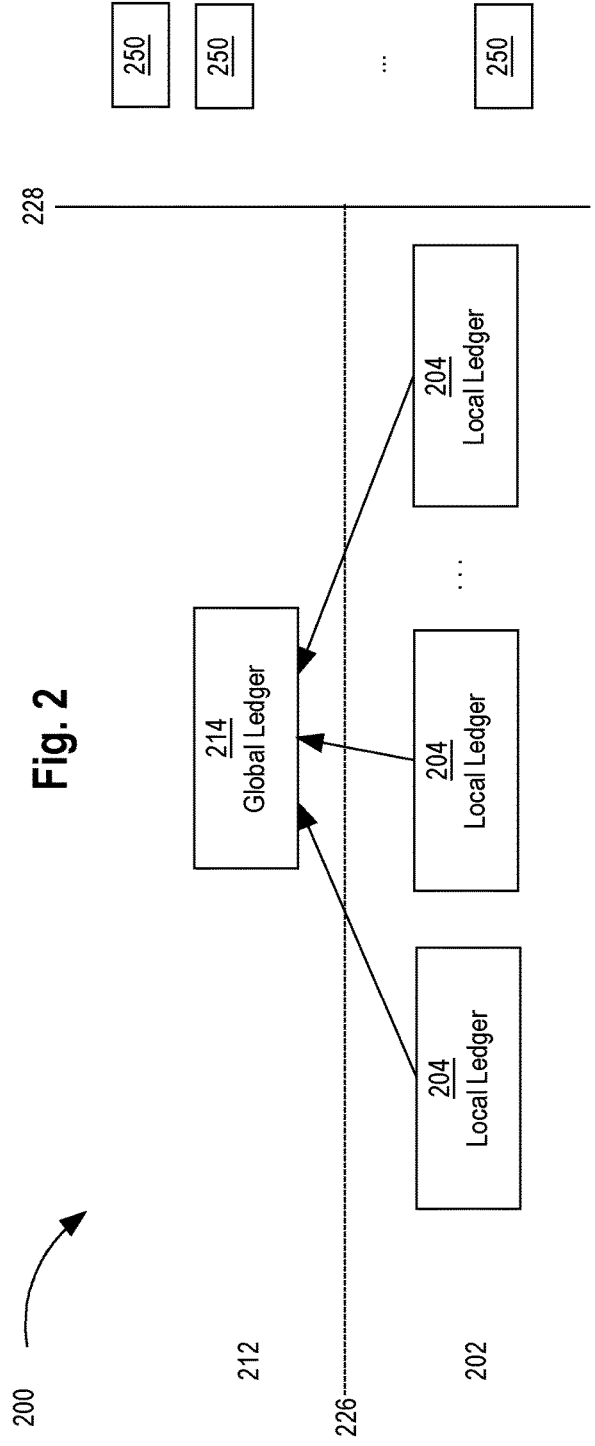

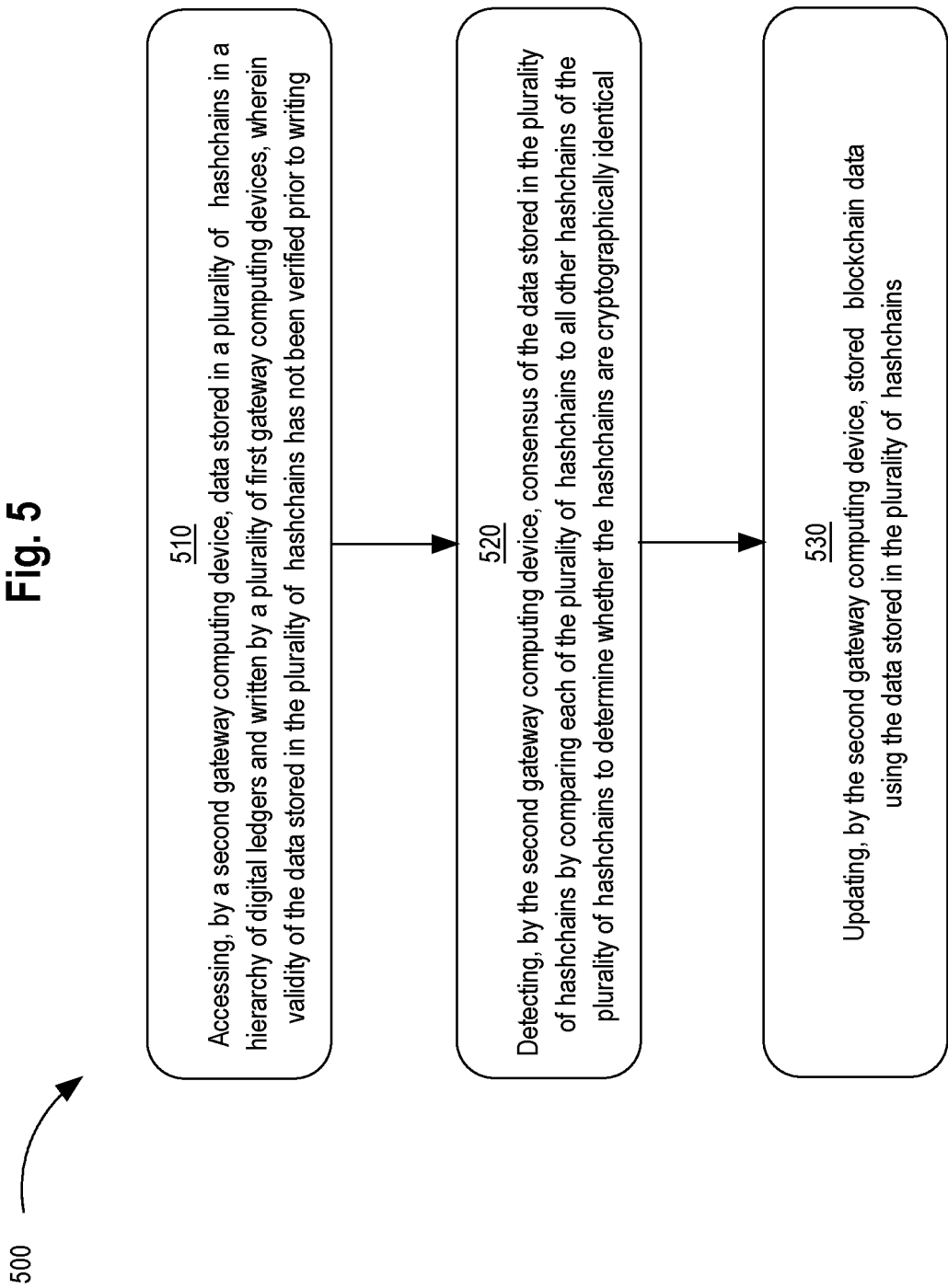

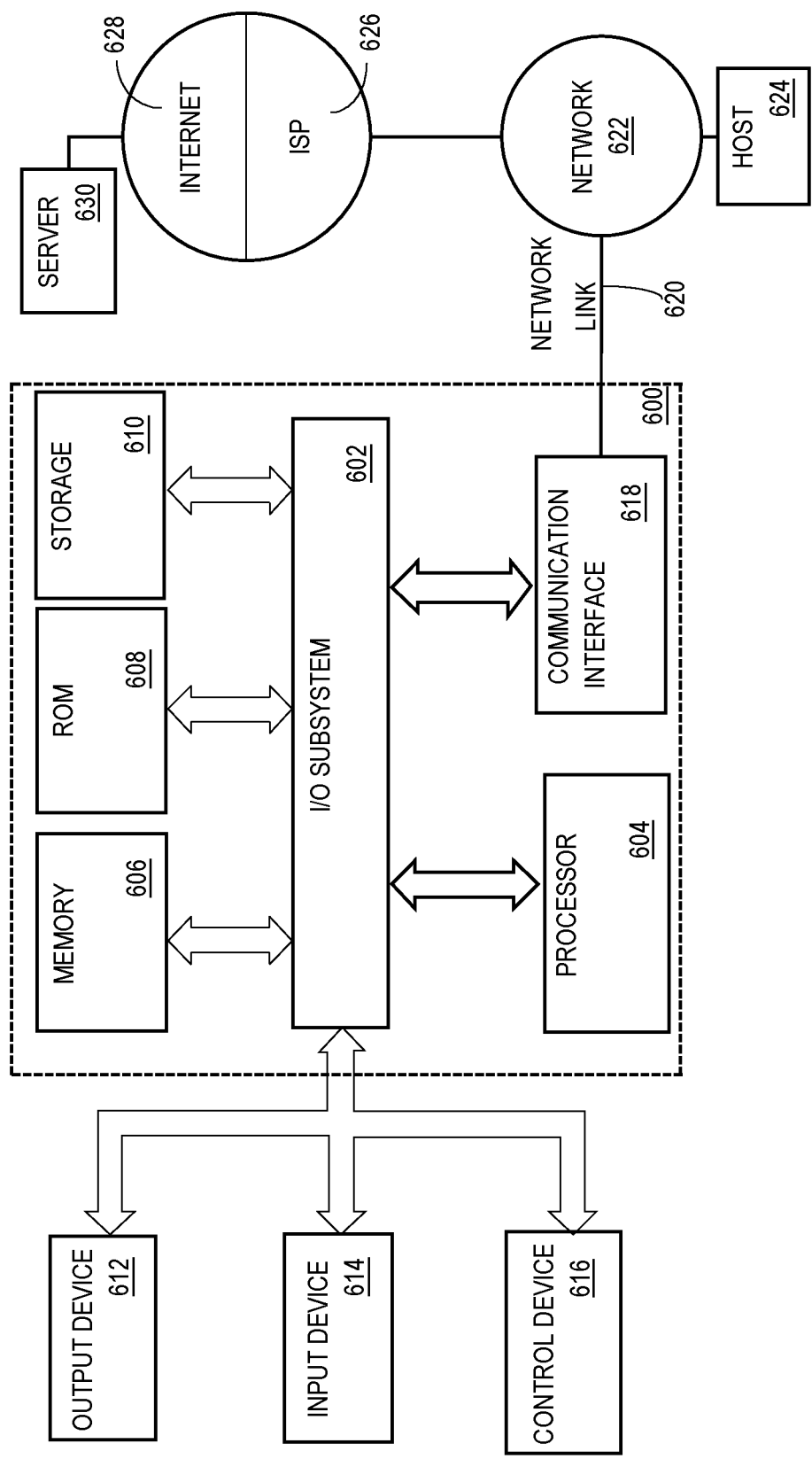

MULTI-LAYER LEDGERS FOR MULTI-PARTY SECURE DATA GOVERNANCE

RELATED APPLICATION; BENEFIT CLAIM

This application claims the benefit under 35 U.S.C. § 120 as a Continuation of application Ser. No. 16/680,788, filed Nov. 12, 2019, now U.S. Pat. No. 10,805,069, the entire contents of which is hereby incorporated by reference for all purposes as if fully set forth herein.

TECHNICAL FIELD

One technical field of the present disclosure relates to methods, systems, computer software, and/or computer hardware in the field of data security. Another technical field is services to prevent unauthorized access and use of data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The development and deployment of internet of things (IoT) devices has proceeded with remarkable speed in the past several years. IoT devices are diverse, including everything from controllers of industrial equipment to smart watches and personal activity monitors. However, security infrastructure has not kept pace with the huge number and wide use of these devices. Some analysts estimate that billions of such devices will be operating and connected to internetworks within a few years, but there is presently no effective security architecture that can efficiently secure data generated by IoT devices, especially when data flows through various intermediaries before reaching a final destination.

Thus, there is a need for ensuring data is consistent and trustworthy. There is also a need for a secure method of storing and accessing data that is tolerant of security breaches.

SUMMARY

The appended claims may serve as a summary of the invention.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 illustrates an example data repository, in accordance with some embodiments.

FIG. 2 illustrates an example hierarchy of ledgers, in accordance with some embodiments.

FIG. 5 illustrates an example method of providing data governance as data flows within and between networks, in accordance with some embodiments.

FIG. 6 illustrates a computer system upon which an embodiment of the invention may be implemented.

DETAILED DESCRIPTION

Figure 3:
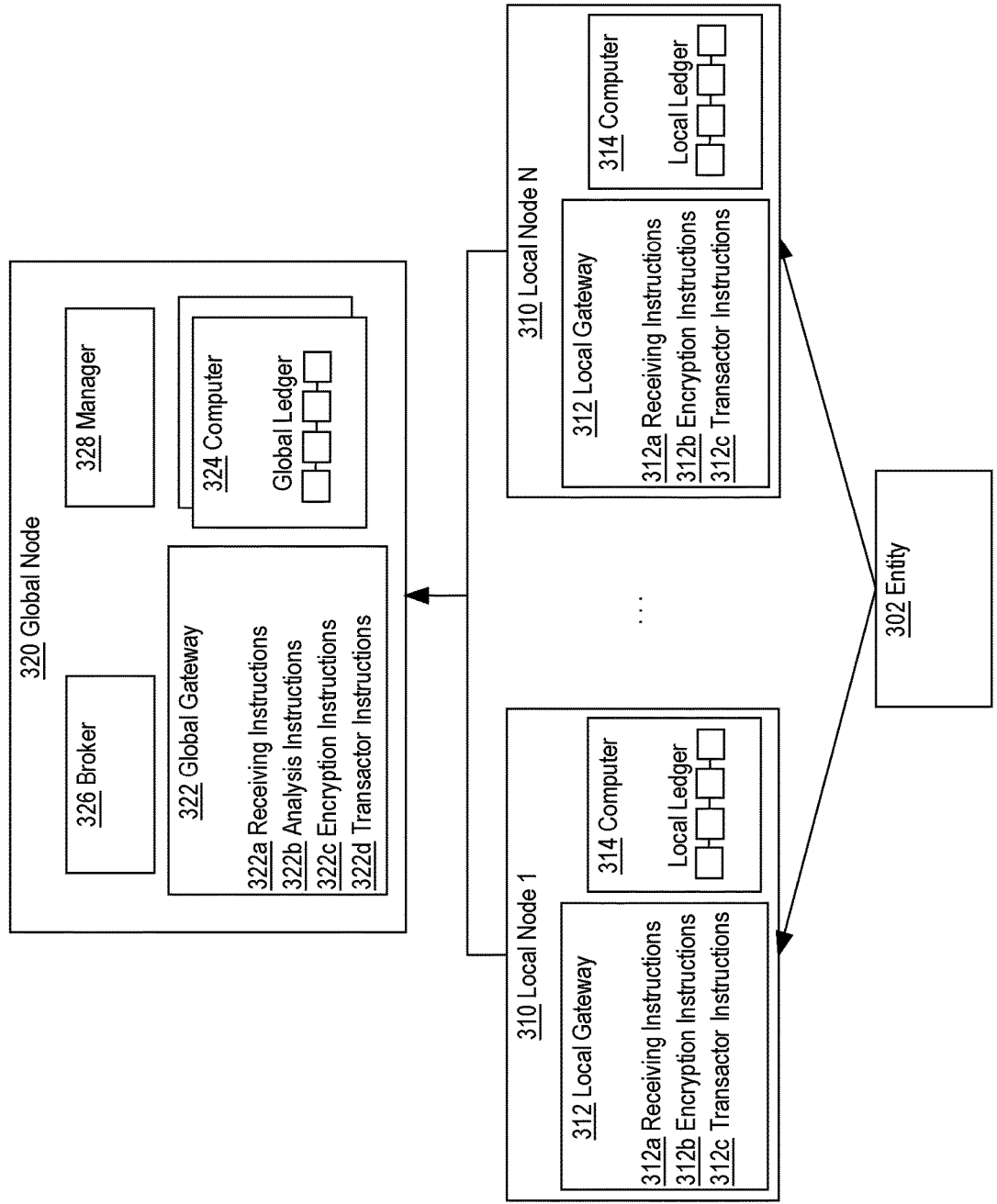
FIG. 3 illustrates an example networked computer system implementing a hierarchy of ledgers, in accordance with some embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein in sections according to the following outline:

1.0 GENERAL OVERVIEW
   2.0 TYPES OF DIGITAL LEDGERS
      2.1 BLOCKCHAIN
      2.2 HASH CHAIN
   3.0 HIERARCHICAL LEDGERS
      3.1 INTEGRITY
      3.2 PRIVACY
   4.0 EXAMPLE DISTRIBUTED COMPUTER SYSTEM IMPLEMENTATIONS
      4.1 MULTI-SITE EXAMPLE
      4.2 PEER-TO-PEER EXAMPLE
   5.0 PROCEDURAL OVERVIEW
   6.0 HARDWARE OVERVIEW
   7.0 OTHER ASPECTS OF DISCLOSURE

1.0 GENERAL OVERVIEW

According to various embodiments, methods and systems are provided that enable improved computer processing efficiency and data governance as data flows within the same network and between different networks. A distributed system uses a hierarchy of ledgers for access control, data integrity, confidentiality, tracking changes, and multi-party node validation of data. Nodes may use different ledger implementations, depending on environment needs and/or requirements. For example, a hash chain may be used by a node to store data that have high throughput requirements. Validation of data in a ledger occurs at each node writing the data. Data in a ledger may be encrypted before the data is written out of network to another storage system or network.

In an embodiment, a computer-implemented method of providing data governance as data flows within and between networks, comprising accessing, by a second gateway computing device, data stored in a plurality of hash chains in a hierarchy of digital ledgers and written by a plurality of first gateway computing devices, wherein validity of the data stored in the plurality of hash chains has not been verified prior to writing. The method further comprises detecting, by the second gateway computing device, consensus of the data stored in the plurality of hash chains by comparing each of the plurality of hash chains to all other hash chains of the plurality of hash chains to determine whether the hash chains are cryptographically consistent. The method further comprises in response to detecting consensus of the data stored in the hash chains, updating, by the second gateway computing device, stored blockchain data using the data stored in the plurality of hash chains.

2.0 TYPES OF DIGITAL LEDGERS

A digital ledger tracks numerous entries. There may be more than one copy of the entire ledger that are stored at one or more computers. Example applications of a digital ledger are described in U.S. application Ser. No. 15/485,047, filed Apr. 11, 2017, U.S. Pat. No. 10,432,585, filed Apr. 12, 2017 and issued Oct. 1, 2019, U.S. Pat. No. 10,104,077, filed Oct. 6, 2017 and issued Oct. 16, 2018, U.S. application Ser. No. 15/813,493, filed Nov. 15, 2017, U.S. Pat. No. 10,084,600, filed Apr. 16, 2018 and issued Sep. 25, 2018, U.S. Pat. No. 10,270,770, filed Aug. 23, 2018 and issued Apr. 23, 2019, U.S. Pat. No. 10,084,826, filed May 14, 2018 and issued Sep. 25, 2018, U.S. application Ser. No. 16/133,323, filed Sep. 17, 2018, U.S. Pat. No. 10,404,696, filed Sep. 17, 2018 and issued Sep. 3, 2019, and U.S. Pat. No. 10,326,802, filed Dec. 4, 2018 and issued Jun. 18, 2019, wherein the entire contents of which are hereby incorporated by reference as if fully set forth herein.

There are different implementations of a digital ledger. Example implementations include a blockchain and a hash chain.

2.1 Blockchain

An example ledger is a distributed ledger, such as a blockchain. In a blockchain implementation, the distributed ledger functions as a decentralized digital ledger that may track numerous entries. Copies of the entire distributed ledger may be stored at each computer in a distributed network of interconnected computers. Proposed entries to the distributed ledger may be checked by a majority of the computers for verification. For example, if a computer attempts to generate a new entry in the distributed ledger, the network of interconnected computers that also store copies of the distributed ledger would first run algorithms to evaluate the hashes and verify the validity of the entry. If a majority of the computers agree that the entry is valid, then the entry will be added as a new block in the distributed ledger. As a part of a consensus network, distributed ledger enforces high Practical Byzantine Fault Tolerance (PBFT) and other types of consensus algorithms; for example, a malicious attack attempting to alter the information in the distributed ledger would need to control over 50% of the computers in the consensus network to alter the consensus. Since it would be exceedingly difficult to maliciously attack and maintain control over that many computers, the distributed ledger data is better protected against malicious attacks than traditional methods of data storage.

FIG. 1 illustrates an example data repository. In an example embodiment, the data repository 100 is a digital ledger database. The data repository 100 comprises a ledger having blocks 110, 120, 130. The ledger may include any number of blocks. In the example of FIG. 1, each block 110, 120, 130 may include its own index number 111, 121, 131, timestamp 112, 122, 132, data 113, 123, 133, hash 114, 124, 134, and previous hash 115, 125, 135.

The index number 111, 121, 131 may be a numerical index that indicates the block's placement in the chain. The timestamp 112, 122, 132 may be the date and time of when a block 110, 120, 130 is created. The data 113, 123, 133 may be an encrypted share stored as "block0data," "block1data," and "block2data" in the blocks 110, 120, 130, respectively. The hash 114, 124, 134 may be a hash of the encrypted share, such as an MD5 hash, SHA256 hash, or RIPEMD hash. The previous hash 115, 125, 135 may be the hash of the previous block, which links the blocks in sequence. In the example of FIG. 1, the block 130 stores a record of the previous hash 124, while the block 120 stores a record of the previous hash 114. These records of previous hashes link each new block to the previous block to form a chain that allows for integrity checks of each block.

2.2 Hash Chain

A hash chain is similarly configured as a blockchain, except that proposed entries are not verified by multiple computers. In a hash chain implementation, new entries are added as new blocks in the ledger by a computer, without verification from other computers. Since verifications from other computers are not being performed for each entry, the hash chain implementation is faster than the blockchain implementation and, thus, may be better suited in environments where there are higher data throughput requirements (e.g., generating data at a higher velocity).

In an embodiment, data from a source may be written to multiple hash chains and may be signed, using encryption, by parties writing the data to the hash chains. Periodically or on demand, two or more hash chains may be subsequently compared to determine validity of entries based on whether they are cryptographically consistent.

3.0 HIERARCHICAL LEDGERS

A hierarchy of ledgers may be used for multi-party secure data governance of data moving through different parties, in the same network or different networks, to ensure access control, integrity, confidentiality, track changes, and multi-party node validation.

FIG. 2 illustrates an example hierarchy of ledgers. The example hierarchy 200 is shown in FIG. 2 as having two levels: a local level 202 and a global level 212. However, a hierarchy of ledgers may have more than two levels, including one or more intermediate levels.

Data generated by one or more entities (e.g., IoT devices, buildings, vehicles, etc.) may locally written to local ledgers 204. Periodically or on demand, data from the local ledgers 204 are sent higher up in the hierarchy to be written to a higher up ledger, such as global ledger 214. Before data is written from one ledger (e.g., local ledger) to another ledger (e.g., global ledger), there must be consensus regarding the data being written to ensure data validity.

In an embodiment, data from local ledgers 204 may be consolidated (e.g., only consistent versions of the data are written) in global ledger 214. Alternatively, data from local ledgers 204 may be aggregated (e.g., all data combined) in global ledger 204.

Different ledger implementations may be employed at different levels and/or within each level, which is separated by a dotted line 226 in FIG. 2. For example, local ledgers 204 may be hash chain based while global ledger 214 may be blockchain based. Regardless of different ledger implementations used at and within each level, global ledger 214 eventually has a global or full view of all data stored in local ledgers 204.

One or more entities may generate data to be written to a single local ledger 204. An entity may be computer, software, firmware, hardware, or any combination thereof. In an embodiment, the entity may be a computer, a virtual computer, and/or a computing device. As an example, a computer may be one or more server computers, cloud-based computers, cloud-based cluster of computers, docker containers, virtual machine instances or virtual machine computing elements such as virtual processors, storage and memory, data centers, storage devices, desktop computers, laptop computers, mobile devices, and/or any other special-purpose computing devices.

An entity may also be a physical device with network connectivity capabilities that enable the physical device to collect and exchange data. For example, an entity may include or may be an IoT device. Example IoT device is an industrial IoT meter, sensor, controller, camera, or any other industrial IoT device.

In an embodiment, an entity may be one or more of a variety of networked computing devices in an industrial control system, such as a Supervisory Control and Data Acquisition (SCADA) system that uses a series of computers, programmable logic controllers, Proportional Integral Derivative (PID) controllers, Programmable Logic Controllers (PLCs), remote terminal units, and other networked devices for process control in an industrial environment. An entity may also be a software application or any other stored computing instructions running on a computing device.

Data is transmitted between entities and ledgers and between ledgers in one or more networks. A network broadly represents a combination of one or more wireless or wired networks, such as local area networks (LANs), wide area networks (WANs), metropolitan area networks (MANs), global interconnected internetworks, such as the public internet, or a combination thereof. Each such network may use or execute stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth.

3.1 Integrity

In an embodiment, a global ledger 214 may be used and/or maintained by a corporation, such as at its headquarters, while local ledgers 204 may be used and/or maintained by one or more local sites. While local sites may not be in communication with headquarters at all times, data from one or more entities can be continuously written to local ledgers 204. Local validation of data written to a local ledger 204 occurs as every signature relies on the previous block in the local ledger 204 and the corresponding signature of the previous block. Integrity of data in local storage is achieved through chaining the hash of the entries in the block ledger and generating a MAC of the hash using an evolving symmetric key that is shared with the headquarters.

When a local site is connected back to its headquarters, multiple local ledgers 204 associated within the local site may be independently sent to headquarters to be written to the global ledger 214. Global validation of data written to the global ledger 214 occurs as data from the multiple local ledgers 204 is written to the global ledger 214 only when there is no data discrepancy. Put differently, data from the multiple local ledgers 204 is written to the global ledger 214 only when there is consensus of data to ensure integrity of data coming from the local site.

For example, multiple local hash chains 204 used by a local site(s) may be compared to determine whether they are cryptographically consistent. In an embodiment, the last blocks of the multiple hash chains 204 may be compared. If the local hash chains 204 are cryptographically consistent, data is admitted to a global ledger 214 as there is consensus of data in the local hash chains 204. If the local hash chains 204 are not cryptographically consistent, data may not be admitted to the global ledger 214 as there is no consensus of data.

For another example, data in a blockchain 204 used by a local site(s) is admitted, without additional verification, to a global ledger 214 as there had been previous consensus of data when it was written to the local blockchain 204. In a blockchain implementation, new entries are added as new blocks in a blockchain only when a majority of computers in a distributed network of interconnected computers agrees that the entries are valid.

3.2 Privacy

Multi-party trust may be enabled by using asymmetric encryption. In an embodiment, data in a ledger 204, 214 may be encrypted as it is moved or transmitted out from a private corporate network to another network or storage system, such that only the intended third-party 250 will be able to read the data. The private corporate network and an outside network, such as a public network, are separated by a solid line 228 in FIG. 2.

For example, headquarters may determine that data in its global ledger 214 can only be read by a Client A. Data may be encrypted using Client A's public key that is stored in a public key ledger prior to admitting the data in Client A's ledger, which is located outside of the corporate network. Client A accesses its ledger and decrypts data using Client A's private key. Client A may choose to share the data with Client B and may similarly encrypt the data using Client B's public key, that is also stored in the public key ledger, such that only Client B can read the data in Client B's ledger. Client B reads incoming data by using Client B's private key and may even compare signatures of the incoming data and data in the global ledger 214 for validation.

4.0 EXAMPLE DISTRIBUTED COMPUTER SYSTEM IMPLEMENTATIONS

Figure 4:
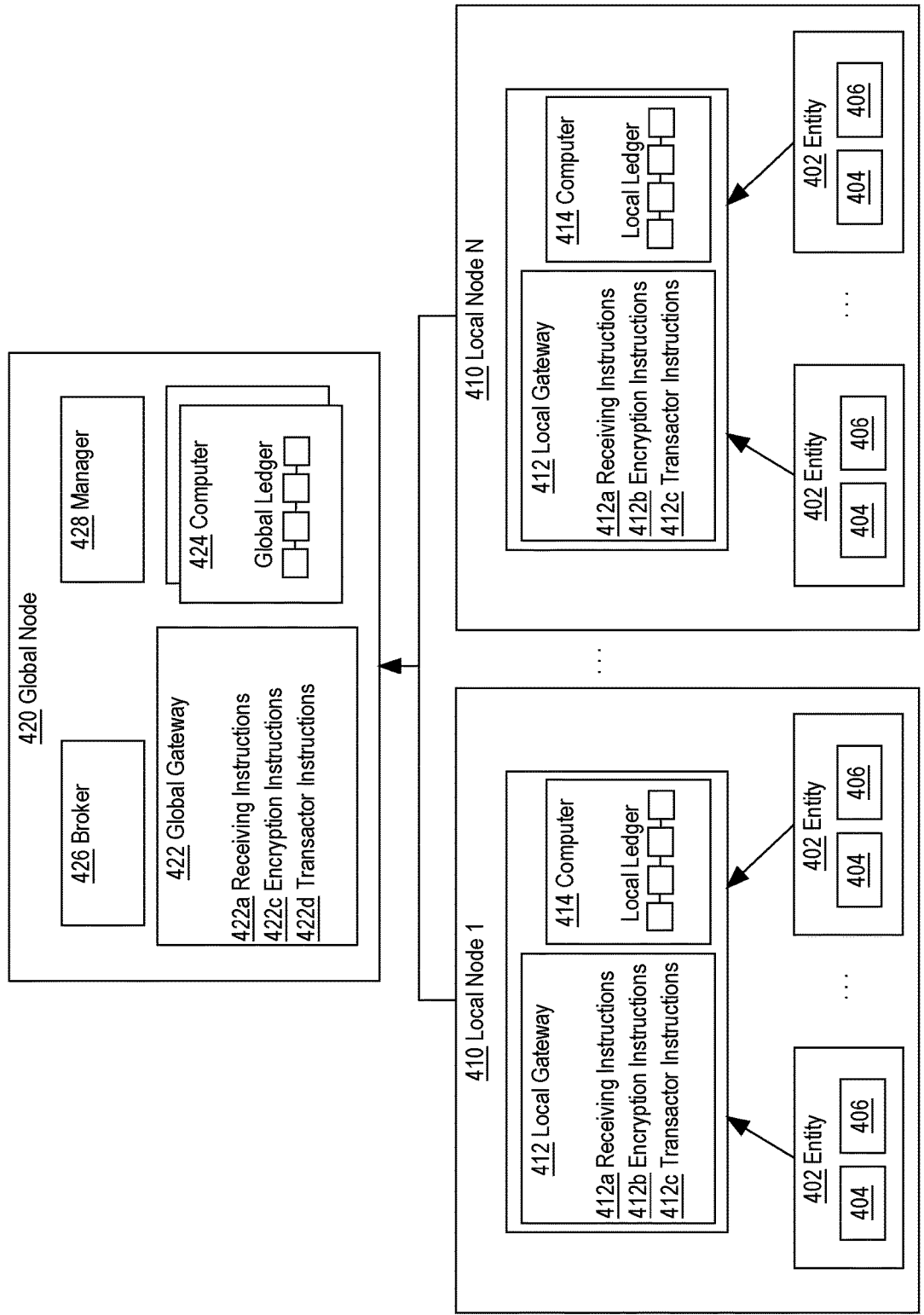
FIG. 4 illustrates another example networked computer system implementing a hierarchy of ledgers, in accordance with some embodiments.

In an embodiment, computer system 300, 400 of FIG. 3 and FIG. 4 described herein comprises components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments. A "computer" may be one or more physical computers, virtual computers, and/or computing devices. As an example, a computer may be one or more server computers, cloud-based computers, cloud-based cluster of computers, docker containers, virtual machine instances or virtual machine computing elements such as virtual processors, storage and memory, data centers, storage devices, desktop computers, laptop computers, mobile devices, and/or any other special-purpose computing devices. Any reference to "a computer" herein may mean one or more computers, unless expressly stated otherwise. The instructions identified above are executable instructions and may comprise one or more executable files or programs that have been compiled or otherwise built based upon source code prepared in JAVA, C++, OBJECTIVE-C or any other suitable programming environment. All computers described herein may be configured to connect to a network and the disclosure presumes that all elements of FIG. 3 and FIG. 4 are communicatively coupled via the network. The various elements depicted in FIG. 3 and FIG. 4 may also communicate with each other via direct communications links that are not depicted in FIG. 3 and FIG. 4 for purposes of explanation.

FIG. 3 and FIG. 4 each illustrates only one of many possible arrangements of components configured to execute the programming described herein. Other arrangements may include fewer or different components, and the division of work between the components may vary depending on the arrangement.

4.1 Multi-Site Example

FIG. 3 illustrates an example networked computer system implementing a hierarchy of ledgers.

An entity 302 may generate high velocity data. An entity 302 may be computer, software, firmware, hardware, or any combination thereof. In an embodiment, the entity may be a computer, a virtual computer, and/or a computing device. As an example, a computer may be one or more server computers, cloud-based computers, cloud-based cluster of computers, docker containers, virtual machine instances or virtual machine computing elements such as virtual processors, storage and memory, data centers, storage devices, desktop computers, laptop computers, mobile devices, and/or any other special-purpose computing devices.

An entity 302 may also be an IoT device, which is a physical device with network connectivity capabilities that enable the physical device to collect and exchange data. In an embodiment, the IoT device may be industrial IoT meter, sensor, controller, camera, or any other industrial IoT device.

In an embodiment, an entity 302 may be one or more of a variety of networked computing devices in an industrial control system, such as a Supervisory Control and Data Acquisition (SCADA) system that uses a series of computers, programmable logic controllers, Proportional Integral Derivative (PID) controllers, remote terminal units, and other networked devices for process control in an industrial environment. An entity 302 may also be a software application or any other stored computing instructions running on a computing device.

Local nodes 310 may be located at one or more local sites of a corporation. In an embodiment, each local site includes at least two local nodes 310. Data generated by entity 302 may transmitted or broadcasted to one or more local nodes 310 in a local site for redundancy. Although the system 300 is shown in FIG. 3 as including one entity 302 generating data, the system 300 may include more than one entity 302 generating and transmitting data to local nodes 310 in the system 300.

Each local node 310 may include a local gateway 312. The local gateway 312 may be a computer, software and/or hardware or a combination, storing receiving instructions 312a configured to receive data generated by entity 302, encryption instructions 312b configured to encrypt data, and transactor instructions 312c configured to securely transfer data received from entity 302 to a local ledger. The local ledger may be a hash chain since a hash chain implementation is better suited in such an environment with high velocity data. The hash chain is stored on computer 314.

In an embodiment, receiving instructions 312a may receive data that is broadcasted by entity 302 to all local gateways 312 in a local site. Local node 310 may continuously receive entity data even when the local node 310 may not be in communication with the global node 320. Encryption instructions 312b may encrypt data from entity 302 using the local site's own private key, which identifies the party (e.g., local site) encrypting the data. The transactor instructions 312c may apply a hash algorithm, such as an MD5, Secure Hash Algorithm (SHA) 256, or any other hash function, to the encrypted data to generate a hashed data object element. The hash may act as a numerical representation of an object element. Any hash function, as understood in the art, may be used. Any changes to the object element would change the hash, thereby creating differences in the current hash compared to a previous hash. Hashed data object elements are sent to the local ledger for storage using transactor instructions 312c. The transactor instructions 312c update the local ledger by creating new data entries of the encrypted data.

A global node 320, which may be located at corporate headquarters, may include a global gateway 322. The global gateway 322 may be a computer, software and/or hardware or a combination, storing receiving instructions 322a configured to receive data from a local site's local nodes 310, analysis instructions 322b configured to compare data in the local ledgers to determine whether the data is cryptographically consistent, encryption instructions 322c configured to encrypt or decrypt data, and transactor instructions 322d configured to securely transfer data that has been validated to a global ledger. In an embodiment, the global ledger is a distributed ledger, wherein copies of the global distributed ledger are stored on computers 324.

In an embodiment, receiving instructions 322a may receive or otherwise access data in local ledgers associated with the local nodes 310 when the local nodes 310 are in communication with the global node 320. As described elsewhere herein, a hash chain implementation differs from a blockchain implementation in that new entries are added as new blocks in the hash chain without verifying between nodes that entries are valid. Thus, to verify that integrity of the entries, analysis instructions 322b may compare hash values coming from different local ledgers associated with the local nodes 310 to determine if there is a match (e.g., cryptographically consistent). Data are admitted to the global ledger only if hashes match using transactor instructions 322d. Hashes that do not match may indicate that data was lost or was maliciously tampered with, and the global gateway 322 may discard the data and not admit the data to the global ledger. The global gateway 322 may inform local gateways 312 of data inconsistencies.

To ensure access control of data in the global ledger, encryption instructions 322c may encrypt the data in the global ledger as it is written out from the corporate network to another network or storage system.

In an embodiment, the global node 320 may receive data from all local sites' local nodes 310 and store validated data in its global ledger such that the global ledger has a global or full view of all data across the multiple local sites.

In an embodiment, the global node 320 may also include a manager computer 328 configured to manage policies and user interface. For example, the manager computer 328 may generate and/or manage device lifecycle (e.g., key provisioning), participation policy, access control policy, key management (e.g., distribution, generation, and renewal), data aggregation across multiple ledgers, audit logs, system events, etc. The global node 320 may also include a broker computer 326 configured to communicate with existing security services, such as active directory, to verify identify information of entity 302.

4.2 Peer-to-Peer Example

FIG. 4 illustrates another example networked computer system implementing a hierarchy of ledgers.

An entity 402, such as a building or a vehicle, may have the ability to generate and store power. A combination of entities 402 may form a microgrid 410 (labeled as "local node" in FIG. 4), in which the entities 402 in the microgrid 410 can transact. An entity 402 may include a smart energy meter device 404 for measuring and reporting energy consumption and generation by the entity 402. The entity 402, at times, may have surplus energy that it is willing to share with its entity peers in and/or outside its microgrid 410 and, at other times, may need to acquire additional energy from its entity peers in and/or outside its microgrid 410. The entity 402 may include a reporting module 406 for indicating offer data relating to surplus energy that the entity 402 is willing to share and bid data relating to requested energy from other entity peers. In an embodiment, data from entities 402 includes energy data generated by meter devices 404 and offer/bid data generated by reporting modules 406.

Each microgrid 410 may include at least one local gateway 412. The local gateway 412 may be a computer, software and/or hardware or a combination, storing receiving instructions 412a configured to receive data generated by participating entities 402 in the microgrid 410 based on a participating policy, encryption instructions 412b configured to encrypt data, and transactor instructions 412c configured to securely transfer data received from entity 402 to a local ledger stored on one or more computers 414. The local ledger may be a hash chain or a blockchain. In an embodiment, the receiving instructions 412a, the encryption instructions 412b, and the transactor instructions 412c in local gateway 412 may be similarly configured as the receiving instructions 312a, the encryption instructions 312b, and the transactor instructions 312c in local gateway 312 of FIG. 3.

The local ledger may be used by an arbiter computer (not illustrated), which may be located externally from the microgrid 410, to facilitate peer-to-peer transactions. The arbiter computer may make decisions, in real-time, based on the data from the entities 402 that is stored in the local ledger. For example, the arbiter computer may determine, from offer data, which entity 402 is to release energy and may command that entity 402 to release energy to an energy grid. Local transactions may be written to the local ledger by the arbiter computer. The arbiter computer may validate that the agreed upon energy was indeed released to the energy grid and/or was consumed from the energy grid, based on the data from the entities 402 that is stored in the local ledger.

A global node 420, which may be located at a utility company, may include at least one global gateway 422. The global gateway 422 may be a computer, software and/or hardware or a combination, storing receiving instructions 422a configured to receive data from microgrids 410, encryption instructions 422c configured to encrypt or decrypt data, and transactor instructions 422d configured to securely transfer data received from microgrids 410 to a global ledger. In an embodiment, the global ledger is a distributed ledger, wherein copies of the global distributed ledger are stored on computers 424. In an embodiment, the receiving instructions 422a, the encryption instructions 422c, and the transactor instructions 422d in global gateway 422 may be similarly configured as the receiving instructions 322a, the encryption instructions 322c, and the transactor instructions 322d in global gateway 322 of FIG. 3.

In an embodiment, the global ledger may be used as a financial settlement between transacting entities 402 and/or may be used for auditing purposes.

In an embodiment, the global node 420 may also include a manager computer 428 configured to manage policies and user interface. For example, the manager computer 428 may generate and/or manage a participation policy of entities 402 authorized to participate in peer-to-peer transactions, that is accessible by local gateways 412. The global node 420 may also include a broker computer 426 configured to communicate with existing security services, such as active directory, to verify identify information of entities 402 and/or arbiter computer.

5.0 PROCEDURAL OVERVIEW

FIG. 5 illustrates an example method 500 of providing data governance as data flows within and between networks, in accordance with some embodiments. FIG. 5 may be used as a basis to code the method 500 as one or more computer programs or other software elements that a global gateway can execute or host.

The method 500 may start at step 510, at which a second gateway computing device may access data stored in a plurality of hash chains in a hierarchy of digital ledgers and written or updated by a plurality of first gateway computing devices. The second gateway computing device may be, for example, a global gateway. The plurality of first gateway computing devices may be, for example, a plurality of local gateways. Validity of data stored in the plurality of hash chains has not been verified prior to writing.

Unlike a blockchain, entries in a hash chain are not verified by a majority of computers in a distributed network of interconnected computers. Instead, entries are added as new blocks in the hash chain without verification from other computers. In addition, an inlined computer (e.g., Xage Enforcement Point) or a gateway could validate the authenticity of the device who generates the data by fingerprinting (hardware, software, firmware, file system, etc.) each device before accepting the data. This is a way to trust the device who is the data producer.

Different ledger implementations may be employed at different levels and/or within each level of the hierarchy of digital ledgers.

The second gateway computing device may be located at a global or central location, while the first gateway computing devices may be located at one or more sites associated with the global location. In an embodiment, a site may include at least two of the first gateway computing devices.

At step 520, the second gateway computing device may detect consensus of the data stored in the plurality of hash chains by comparing each of the plurality of hash chains to all other hash chains of the plurality of hash chains to determine whether the hash chains are cryptographically consistent. For example, analysis instructions of the second gateway may detect consensus of the data stored in the plurality of the first digital ledgers. In an embodiment, the analysis instructions may compare hash values coming from the hash chains determine whether the hash chains are cryptographically consistent. If the hash chains are cryptographically consistent, then there is consensus of data stored in the hash chains.

At step 530, the second gateway computing device updates stored blockchain data using the data stored in the plurality of hash chains. In an embodiment, the stored blockchain data is updated in response to detecting consensus of the data stored in the hash chains.

The stored blockchain data is stored in a distributed ledger. In an embodiment, the distributed ledger is a blockchain. The blockchain is in the hierarchy of digital ledgers. In an embodiment, the blockchain is in a level in the hierarchy of digital ledgers that is higher than one or more levels the hash chains are in. In an embodiment, the blockchain stores data from all digital ledgers in the hierarchy such that the blockchain has a global or full view of all data in the hierarchy.

In an embodiment, encryption instructions of the second gateway may asymmetrically encrypt the stored blockchain data such that only the intended third-party can read the data.

Using the foregoing techniques, programmed computers may ensure access control, integrity, confidentiality, track changes, and multi-party node validation of data as the data moves through different parties. The present approach utilizes a hierarchy of ledgers. The ledgers may be of different implementations. Faster ledger implementations, such as hash chains, may be used by local gateways to store generated data that have fast throughput. Periodically or on demand, data from local ledgers are sent to a global gateway for storing in global ledger. Only data from the local ledgers that have been validated are written to the higher up global ledger.

The approaches disclosed herein improve data integrity at the local level and at the global level. Local validation of data written to the local ledgers occurs as every signature relies on the previous block in the local ledger, and global validation of data written to the global ledger occurs as only validated or agreed upon data is written to the global ledger. The global ledger has a global or full view of all data stored in local ledgers.

Furthermore, the approaches disclosed herein also improve data privacy. A gateway may asymmetrically encrypted data in a ledger before the data is written out of network to another storage system or network, such that only the intended third-party will be able to read the data.

It will be apparent from the disclosure as a whole that the purpose and character of the disclosure is directed to practical applications of computer technology in the form of programs, processes, messaging techniques, data storage techniques and the like that provide improvements in governance for data that is generated by distributed networked devices, especially IoT devices.

6.0 HARDWARE OVERVIEW

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

FIG. 6 is a block diagram that illustrates an example computer system with which an embodiment may be implemented. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which may include a bus and/or other communication mechanism(s) for communicating information and/or instructions between the components of the computer system 600 over electronic signal paths. The I/O subsystem 602 may include an I/O controller, a memory controller and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller and/or a special-purpose microprocessor such as an embedded system or a graphics processing unit (GPU) or a digital signal processor or ARM processor. Processor 604 may comprise an integrated arithmetic logic unit (ALU) or may be coupled to a separate ALU.

Computer system 600 includes one or more units of memory 606, such as a main memory, which is coupled to I/O subsystem 602 for electronically digitally storing data and instructions to be executed by processor 604. Memory 606 may include volatile memory such as various forms of random-access memory (RAM) or other dynamic storage device. Memory 606 also may be used for storing temporary variables or other intermediate information during execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read only memory (ROM) 608 or other static storage device coupled to I/O subsystem 602 for storing information and instructions for processor 604. The ROM 608 may include various forms of programmable ROM (PROM) such as erasable PROM (EPROM) or electrically erasable PROM (EEPROM). A unit of persistent storage 610 may include various forms of non-volatile RAM (NVRAM), such as FLASH memory, or solid-state storage, magnetic disk or optical disk such as CD-ROM or DVD-ROM and may be coupled to I/O subsystem 602 for storing information and instructions. Storage 610 is an example of a non-transitory computer-readable medium that may be used to store instructions and data which when executed by the processor 604 cause performing computer-implemented methods to execute the techniques herein.

The instructions in memory 606, ROM 608 or storage 610 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 600 may be coupled via I/O subsystem 602 to at least one output device 612. In one embodiment, output device 612 is a digital computer display. Examples of a display that may be used in various embodiments include a touch screen display or a light-emitting diode (LED) display or a liquid crystal display (LCD) or an e-paper display. Computer system 600 may include other type(s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators or servos.

At least one input device 614 is coupled to I/O subsystem 602 for communicating signals, data, command selections or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on display 612. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 614 may include a combination of multiple different input devices, such as a video camera and a depth sensor.

In another embodiment, computer system 600 may comprise an internet of things (IoT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders and the output device 612 may comprise a special-purpose display such as a single-line LED or LCD display, one or more indicators, a display panel, a meter, a valve, a solenoid, an actuator or a servo.

When computer system 600 is a mobile computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 may include hardware, software, firmware and interfaces for generating position reporting packets, notifications, pulse or heartbeat signals, or other recurring data transmissions that specify a position of the computer system 600, alone or in combination with other application-specific data, directed toward host 624 or server 630.

Computer system 600 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 610. Volatile media includes dynamic memory, such as memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 602. Transmission media can also take the form of acoustic or light waves, such as those generated during radio-wave and infra-red data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to a format that can be read by computer system 600. For instance, a receiver such as a radio frequency antenna or an infrared detector can receive the data carried in a wireless or optical signal and appropriate circuitry can provide the data to I/O subsystem 602 such as place the data on a bus. I/O subsystem 602 carries the data to memory 606, from which processor 604 retrieves and executes the instructions. The instructions received by memory 606 may optionally be stored on storage 610 either before or after execution by processor 604.

Computer system 600 also includes a communication interface 618 coupled to bus 602. Communication interface 618 provides a two-way data communication coupling to network link(s) 620 that are directly or indirectly connected to at least one communication networks, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 622 broadly represents a local area network (LAN), wide-area network (WAN), campus network, internetwork or any combination thereof. Communication interface 618 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic or optical signals over signal paths that carry digital data streams representing various types of information.

Network link 620 typically provides electrical, electromagnetic, or optical data communication directly or through at least one network to other data devices, using, for example, satellite, cellular, Wi-Fi, or BLUETOOTH technology. For example, network link 620 may provide a connection through a network 622 to a host computer 624.

Furthermore, network link 620 may provide a connection through network 622 or to other computing devices via internetworking devices and/or computers that are operated by an Internet Service Provider (ISP) 626. ISP 626 provides data communication services through a world-wide packet data communication network represented as internet 628. A server computer 630 may be coupled to internet 628. Server 630 broadly represents any computer, data center, virtual machine or virtual computing instance with or without a hypervisor, or computer executing a containerized program system such as DOCKER or KUBERNETES. Server 630 may represent an electronic digital service that is implemented using more than one computer or instance and that is accessed and used by transmitting web services requests, uniform resource locator (URL) strings with parameters in HTTP payloads, API calls, app services calls, or other service calls. Computer system 600 and server 630 may form elements of a distributed computing system that includes other computers, a processing cluster, server farm or other organization of computers that cooperate to perform tasks or execute applications or services. Server 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 630 may comprise a web application server that hosts a presentation layer, application layer and data storage layer such as a relational database system using structured query language (SQL) or no SQL, an object store, a graph database, a flat file system or other data storage.

Computer system 600 can send messages and receive data and instructions, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage 610, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

7.0 OTHER ASPECTS OF DISCLOSURE

In the foregoing specification, embodiments of the invention have been described with reference to numerous specific details that may vary from implementation to implementation. Thus, the sole and exclusive indicator of what is the invention and, is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various operations have been described using flowcharts. In certain cases, the functionality/processing of a given flowchart step may be performed in different ways to that described and/or by different systems or system modules. Furthermore, in some cases a given operation depicted by a flowchart may be divided into multiple operations and/or multiple flowchart operations may be combined into a single operation. Furthermore, in certain cases the order of operations as depicted in a flowchart and described may be able to be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A computer-implemented method of providing data governance as data flows within and between networks, comprising:
    using a global computing device, retrieving data stored in a plurality of local ledgers and written by a plurality of local computing devices, wherein validity of the data stored in the plurality of local ledgers has not been verified prior to writing;
    using the global computing device, determining that the data stored in the plurality of local ledgers is cryptographically consistent and, in response to the determination, updating a global ledger with the data stored in the plurality of local ledgers.

2. The computer-implemented method of claim 1, wherein determining that the data stored in the plurality of local ledgers is cryptographically consistent comprises comparing hash values of the plurality of local ledgers.

3. The computer-implemented method of claim 2, wherein comparing the hash values includes comparing last blocks of the plurality of local ledgers.

4. The computer-implemented method of claim 1, wherein the global ledger is a distributed digital ledger.

5. The computer-implemented method of claim 1, wherein the global ledger and the plurality of local ledgers form a hierarchy of digital ledgers.

6. The computer-implemented method of claim 5, wherein the global ledger is in a level in the hierarchy of digital ledgers that is higher than one or more levels the local ledgers are in.

7. The computer-implemented method of claim 1, further comprising asymmetrically encrypting global ledger data prior to sharing global ledger data to a third-party.

8. One or more non-transitory computer-readable storage media storing one or more instructions programmed for providing data governance as data flows within and between networks and which, when executed by one or more computing devices, cause:
    using a global computing device, retrieving data stored in a plurality of local ledgers and written by a plurality of local computing devices, wherein validity of the data stored in the plurality of local ledgers has not been verified prior to writing;
    using the global computing device, determining that the data stored in the plurality of local ledgers is cryptographically consistent and, in response to the determination, updating a global ledger with the data stored in the plurality of local ledgers.

9. The one or more non-transitory computer-readable storage media of claim 8, wherein determining that the data stored in the plurality of local ledgers is cryptographically consistent comprises comparing hash values of the plurality of local ledgers.

10. The one or more non-transitory computer-readable storage media of claim 9, wherein comparing the hash values includes comparing last blocks of the plurality of local ledgers.

11. The one or more non-transitory computer-readable storage media of claim 8, wherein the global ledger is a distributed digital ledger.

12. The one or more non-transitory computer-readable storage media of claim 8, wherein the global ledger and the plurality of local ledgers form a hierarchy of digital ledgers.

13. The one or more non-transitory computer-readable storage media of claim 12, wherein the global ledger is in a level in the hierarchy of digital ledgers that is higher than one or more levels the local ledgers are in.

14. The one or more non-transitory computer-readable storage media of claim 8, wherein the one or more instructions, when executed by the one or more computing devices, further cause asymmetrically encrypting global ledger data prior to sharing global ledger data to a third-party.

15. A computer system providing data governance as data flows within and between networks, the computer system comprising:
    a ledger data repository;
    a global computing device that is communicatively coupled to the ledger data repository and comprising a non-transitory data storage medium storing a set of instructions which, when executed by the global computing device, cause:
        retrieving data stored in a plurality of local ledgers and written by a plurality of local computing devices, wherein validity of the data stored in the plurality of local ledgers has not been verified prior to writing;
        determining that the data stored in the plurality of local ledgers is cryptographically consistent and, in response to the determination, updating a global ledger with the data stored in the plurality of local ledgers.

16. The computer system of claim 15, wherein determining that the data stored in the plurality of local ledgers is cryptographically consistent comprises comparing hash values of the plurality of local ledgers.

17. The computer system of claim 15, wherein the global ledger is stored in the ledger data repository.

18. The computer system of claim 15, wherein the global ledger and the plurality of local ledgers form a hierarchy of digital ledgers.

19. The computer system of claim 18, wherein the global ledger is in a level in the hierarchy of digital ledgers that is higher than one or more levels the local ledgers are in.

20. The computer system of claim 15, wherein the set of instructions, which executed by the global computer device, further cause asymmetrically encrypting global ledger data prior to sharing global ledger data to a third-party.

* * * * *